(12) United States Patent
Fox (10) Patent No.: US 11,779,001 B2
(45) Date of Patent: Oct. 10, 2023

(54) FISHING LURE LINE ATTACHMENT SYSTEM

(71) Applicant: William Fox, New Richmond, OH (US)

(72) Inventor: William Fox, New Richmond, OH (US)

(*) Notice: Subject to any disclaimer, the term of this patent is extended or adjusted under 35 U.S.C. 154(b) by 59 days.

(21) Appl. No.: 17/400,690

(22) Filed: Aug. 12, 2021

(65) Prior Publication Data
US 2023/0049724 A1    Feb. 16, 2023

(51) Int. Cl.
*A01K 91/04* (2006.01)
*A01K 85/02* (2006.01)

(52) U.S. Cl.
CPC ............... *A01K 91/04* (2013.01); *A01K 85/02* (2013.01)

(58) Field of Classification Search
CPC ....... A01K 91/04; A01K 85/02; A01K 83/066; A01K 83/067; A01K 83/069; A01K 85/00; A01K 85/022; A01K 85/024; A01K 85/025; A01K 85/1811; A01K 85/1813; A01K 85/1821; A01K 85/1851; A01K 85/1867; A01K 91/03; A01K 91/047; A01K 85/205
USPC .... 43/42.36, 42.19; 24/135 R, 135 A, 136 R, 24/136 L, 136 B; 43/43.1, 42.24, 42.26, 42.28, 43/42.4, 42.43, 42.49, 43.2, 43.4, 43.6
See application file for complete search history.

(56) References Cited

U.S. PATENT DOCUMENTS

| | | | | |
|---|---|---|---|---|
| 2,465,064 A * | 3/1949 | Colosimo | ............. | A01K 85/16 43/42.34 |
| 3,041,695 A * | 7/1962 | Ouellette | ............... | A01K 91/04 403/301 |
| 3,105,318 A * | 10/1963 | Birrell | ................... | A01K 93/00 43/44.87 |
| 3,916,556 A * | 11/1975 | Armanno | ............. | A01K 85/16 43/42.22 |
| 4,472,903 A * | 9/1984 | Hutson | .................. | A01K 95/00 43/44.93 |
| 4,627,762 A * | 12/1986 | Scotti | ................... | F16G 11/048 403/369 |
| 4,777,757 A * | 10/1988 | de Marees van Swinderen ......... A01K 85/01 D22/128 |
| 5,709,047 A * | 1/1998 | Link | ..................... | A01K 85/00 43/42.31 |
| 6,260,241 B1 * | 7/2001 | Brennan | ............... | F16G 11/00 24/135 R |

(Continued)

*Primary Examiner* — Timothy D Collins
*Assistant Examiner* — Maria E Graber
(74) *Attorney, Agent, or Firm* — Jenei LLC (57) ABSTRACT

A fishing lure is disclosed herein with a fishing line attachment structure comprising a hook structure, and a body structure mounted on the hook structure. The body structure has a body, a threaded neck having a cylindrical portion defining a first connector, and a head defining a second connector. The head and neck define the attachment structure. The neck includes a port for receiving the fishing line and external circumferential screw threads. The head having an aperture and internal screw threads. The fishing line is adapted to pass through the aperture of the head and the port of the neck and rest on a gripping surface from where the neck integrally mounted to the body, and the head is screwed over the neck while clenching the fishing line between the gripping surface of the body and the head. The fishing lure further comprises a weed guard and bite depth control.

13 Claims, 9 Drawing Sheets

(56) References Cited

U.S. PATENT DOCUMENTS

| | | | | |
|---|---|---|---|---|
| 7,032,344 | B2* | 4/2006 | Gearhart | A01K 85/00 |
| | | | | 43/42.26 |
| 8,402,687 | B1* | 3/2013 | Jarrell | A01K 85/00 |
| | | | | 43/42.28 |
| 9,301,514 | B2* | 4/2016 | Pearcy | A01K 91/03 |
| 9,867,365 | B1 | 1/2018 | Rosenbloom et al. | |
| 11,197,468 | B2* | 12/2021 | Fenton | A01K 91/04 |
| 2004/0216360 | A1 | 11/2004 | Holtzhampf | |
| 2006/0000138 | A1* | 1/2006 | Druk | A01K 91/053 |
| | | | | 43/42.19 |
| 2006/0042147 | A1* | 3/2006 | Jenkins | A01K 85/16 |
| | | | | 43/42.36 |
| 2012/0030990 | A1 | 2/2012 | Rubin et al. | |
| 2020/0120912 | A1 | 4/2020 | Anthony, Jr. | |

* cited by examiner

FISHING LURE LINE ATTACHMENT SYSTEM

TECHNICAL FIELD

The present disclosure relates generally to a fishing lure, and more particularly, to a fishing lure with a fishing line attachment structure for providing a user with the ability to relatively easily and quickly attach the fishing line to the lure without having to tie a knot, and without additional or intermediate structures.

BACKGROUND

Fishing is a worldwide recreational and sustenance activity, with professional and amateur competitions quite common. Many anglers prefer to use artificial lures versus live bait. Consequently, countless artificial bait lures and attachments have been developed to attract and catch fish, and numerous lures and attachments have been adapted to mimic the appearance and movement of common fish prey.

All these attachments are required to connect to a fishing line, which is in turn connected to a fishing pole used for casting and retrieving the lure and fish. One conventional method of connecting fishing line to a fishing lure for example, involves utilization of one or more intermediate connectors. One method of connecting lures involves providing a lure body with an eyelet. The free end of the fishing line is passed through the eyelet and a knot is manually tied using a variety of fishing knots, some of which are very complicated, time consuming and inefficient, and especially so if an angler is aging, young, inexperienced, has poor dexterity or diminished eyesight, and especially in low light conditions or during unstable situations that are typical when fishing, kayaking, and boating.

During fish retrieval, it is common for fishing line to break or come untied at the point of attachment to the lure, thereby losing the fish. So, it is further desirable to have an attachment means that is capable of reliably holding the fighting fish without losing it due to those reasons.

Further, during many competitive fishing events, the speed of attaching lures is important, as is the security of the attachment means.

Therefore, there exists a need for a fishing lure with a fishing line attachment structure for providing a user with the ability to relatively easily and quickly attach the fishing line to the lure without having to tie a knot and without extraneous intermediate structures.

Also, when fishing in many venues, vegetation, rocks, logs and other debris are present in the water, which also provides cover for the hiding fish, and entices anglers to fish there. However, the vegetation also causes a snag potential during lure retrieval, which poses a hazard for losing lures due to snags, and adding time to unsnag the lure, ultimately resulting in fewer fish catches.

Therefore, there also exists a need for a deflection guard to prevent hooks from snagging vegetation, rocks, and other debris in the water, to enable smooth trouble-free retrieval without delays and lost lures. Yet this weed and debris guard must not inhibit the hook from catching a fish's mouth.

During fishing, it is also common for some fish to swallow the hook too deeply, thereby making removal difficult without harming the fish, and/or taking a long time to remove the hook from deep inside a fish's mouth, gills, or gut.

Therefore, it is also desirable to provide a means on the lure to prevent the fish from swallowing the hook too deeply, such that removal of the hook is difficult or harmful to the fish, both in terms of damage to the fish's mouth and internal organs and reducing the duration of time the fish must be kept out of the water during hook removal, especially if releasing the fish to the water when practicing "catch and release".

SUMMARY OF THE INVENTION

The present invention discloses a fishing lure and a fishing line attachment structure. The fishing lure comprises a fishing hook structure and a body structure mounted on the fishing hook structure, with the body structure having a fishing line attachment structure. Alternatively, the fishing hook structure can comprise an adapter for attaching existing fishing lures already in the possession of anglers. The fishing line attachment structure includes a first connector adapted to receive a fishing line, and a second connector configured to lock with the first connector while clenching the fishing line therebetween. The body structure includes a body and a neck defining the first connector. The neck has a cylindrical portion extending from the body and a slot or port extending angularly along a proximal length of axis of the cylindrical portion.

Further, the neck has a top side, a bottom side and a sidewall extending between the top and bottom side. The port extends from the top side of the neck and opens at an exterior side of sidewall of the neck. The neck further includes external circumferential screw threads configured on at least a portion of a longitudinal extent of the neck. The body structure further comprises a head defining the second connector. The head includes an aperture at a proximal portion, and internal screw threads. Further, the head internal threads are adapted to screw onto and lock with the external circumferential threads on the neck.

The fishing line is adapted to pass through the aperture of the head and the port of the neck, and then rest on a gripping surface from where the neck integrally mounts to the body, and the head is snugged tightly to the opposing clenching surface by rotating the head around the neck to clench the fishing line between the gripping surface of the body and the head. The gripping surface radiates generally outward at angle from the axis of the neck. The lure further may comprise at least two non-metallic polymer, soft material, or metal members disposed over the neck and between the surface and the head so that the fishing line may be safely clenched without damage. The fishing lure further comprises a weed guard and bite depth control mounted proximal to the fishhook. The weed guard and bite depth control comprise a central mount and a plurality of legs or finger like projections extending radially or angularly from the axis of the body.

In another embodiment, the body structure comprises a body, a shaft extending from the body and a head adapted to lock with the shaft. The shaft defines the first connector and the head defines the second connector. The body further comprises a ring member disposed over the shaft. The ring member includes a second eyelet adapted for fastening an additional second hook structure or alternatively to attach the fishing line, also wrapping the fishing line around the neck of the body and subsequently clenching the line between the head and gripping surfaces, in a jig configuration. The second eyelet may also be positioned at an angle from the axis of the body to create an alternative swim behavior. The body further comprises at least two non-metallic members disposed above the ring member. Further, the head includes a proximal eyelet to allow passage of the fishing line and loop around the shaft of the body and between the non-metallic members before wrapping the fishing line between the clenching surfaces, locking the head with the neck, and with the fishing line securely attached therebetween.

DETAILED DESCRIPTION OF EXAMPLE EMBODIMENTS

Example embodiments of the disclosure now will be described more fully hereinafter with reference to the accompanying drawings, in which example embodiments are shown. The concepts discussed herein may, however, be embodied in many different forms and should not be construed as limited to the example embodiments set forth herein; rather, these embodiments are provided so that this disclosure will be thorough and complete, and will fully convey the scope to those of ordinary skill in the art. Like numbers refer to like elements but not necessarily the same or identical elements throughout.

Figure 1:
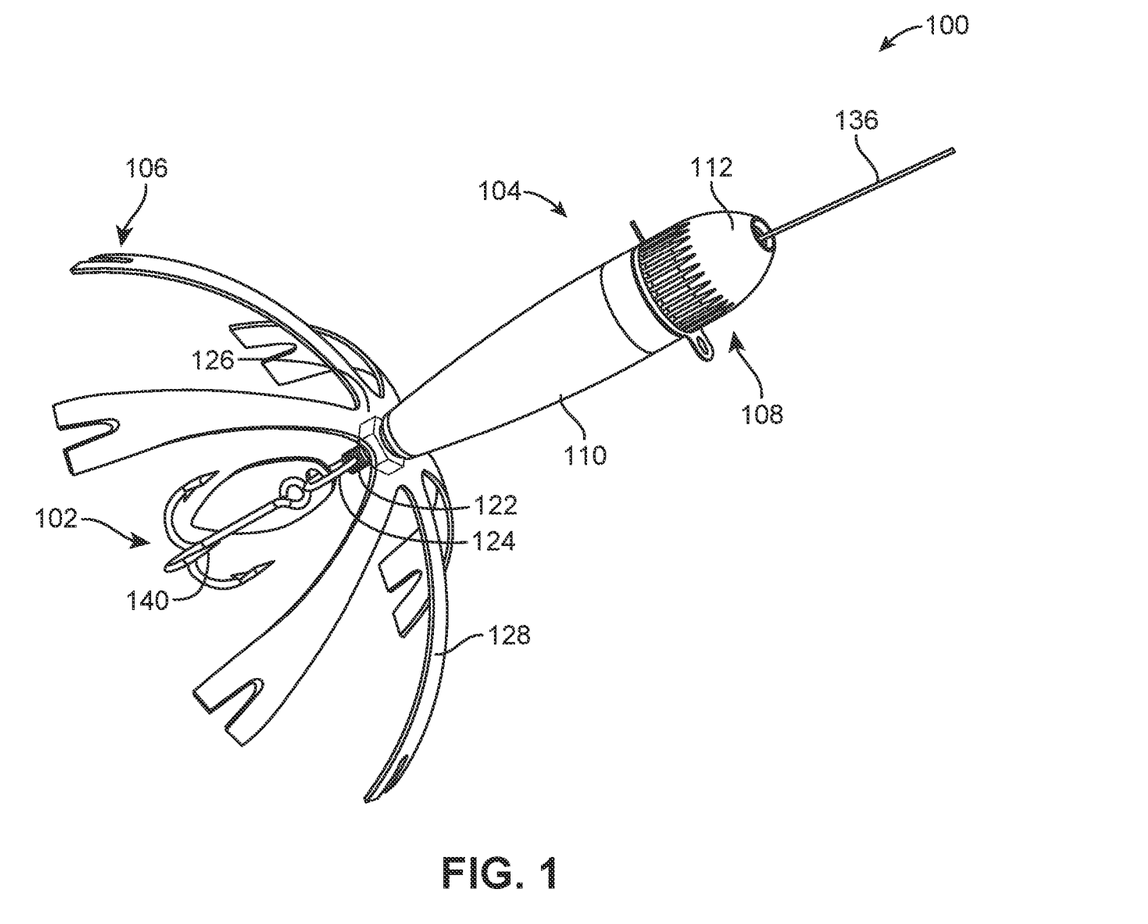
FIG. 1 exemplarily illustrates a perspective view of a fishing lure according to an embodiment of the present invention.

The present invention discloses a fishing lure with a fishing line attachment structure for providing a user with the ability to relatively easily and quickly attach the fishing line to the lure without having to tie a knot and without having to utilize additional or intermediate structures. FIG. 1 exemplarily illustrates a perspective view of a fishing lure 100 according to an embodiment of the present invention. Referring to FIG. 1, the fishing lure 100 (also referred as lure 100) comprises a fishing hook structure 102, a body structure 104 mounted to the fishing hook structure 102 and a weed guard and bite depth control 106 mounted between the fishing hook structure 102 and the body structure 104. It is to be noted that weed guard and bite depth control 106 is an optional element of the fishing lure 100, and other embodiments of the fishing lure 100 without the weed guard and the bite depth control 106 are well within the ambit of the present invention. A fishing line attachment structure 108 configured on the body structure 104. The body structure 104 comprises a body 110, a neck 114 (shown in FIG. 2) extending from the body 110, and a head 112 locked with the neck 114 while clenching the fishing line 136 therebetween.

The fishing lure 100 may be made of any suitable material or composition such as wood, plastic, silicone, rubber, metal, cork, carbon fiber, and other suitable materials. The fishing lure shown in the figures is meant to be an example of a fishing accessory and does not limit the fishing lure to that specifically shown fishing accessory. For example, a fishing lure shown could be replaced with a lure or bobber of different sizes, shapes (e.g. spherical, oblong, teardrop, football, or irregular), or materials (balloon, hollow spherical plastic, polystyrene, cork, foam, yarn, neoprene, silicone, or other floating material). Alternatively, the fishing lure could be replaced by a weight. Weights may be, for example, magnets, metal (e.g. lead), sand, or any material that would sink in water.

The lure 100 further comprises a first eyelet 122 fixedly coupled to a bottom portion of the body 110 for attaching the fishing hook structure 102 including a hook 140. In one embodiment, a ring 124 is connected to the eyelet 122 such that the ring 124 hangs freely from the eyelet 122. The fishing hook structure 102 is attached to the ring 124 such that the fishing hook structure 102 hangs freely from the ring 124. In one embodiment, the fishing hook structure 102 is a treble hook having at least three legs. The lure 100 further comprises the weed guard and bite depth control 106 mounted between the fishing hook structure 102 and the body structure 104. The weed guard and the bite depth control 106 includes a central mount 126 and a plurality of legs or finger like projections 126 extending radially or angularly from the central mount 126. In one embodiment, the body 110 may be a neutral or negative buoyancy so as to allow the entire assembly to be fully submerged in the water.

In one embodiment, the fishing lure may be configured so that the weed guard and bite depth control 106 can move, rotate, or flex between a relaxed configuration and a tensioned configuration. The weed guard and bite depth control 106 may be configured, or its attachment to the body may be configured, such that the end of the weed guard not connected to the body does not fully enter into the at least partially open volume when the weed guard is in the relaxed configuration. In one embodiment, that end of the weed guard and bite depth control 106 may optionally be able to enter into the open volume when the weed guard is in a tensioned configuration, though it may also be prevented from being able to enter into that volume, such as by limitations in its own flexion, rotation, connection to the head, or by features which prevent such movement, such as by the hook itself. The weed guard member may be unitary, may be made of multiple components, may be entirely flexible, or may contain at least one flexible component. The weed guard and bite depth control 106 may be made of a variety of different sheet materials rolled or formed into a cone or may be injection molded as a thin-walled plastic element. In a preferred embodiment, the weed guard and bite depth control 106 is made of a plastic or plastic film. Other suitable materials include silicone alloys, magnesium alloys, coated paper products, lead, iron, steel, and brass. Ideally this material will be water resistant. The body 110 may be smooth or textured and may be plain or contain a design.

Figure 2:
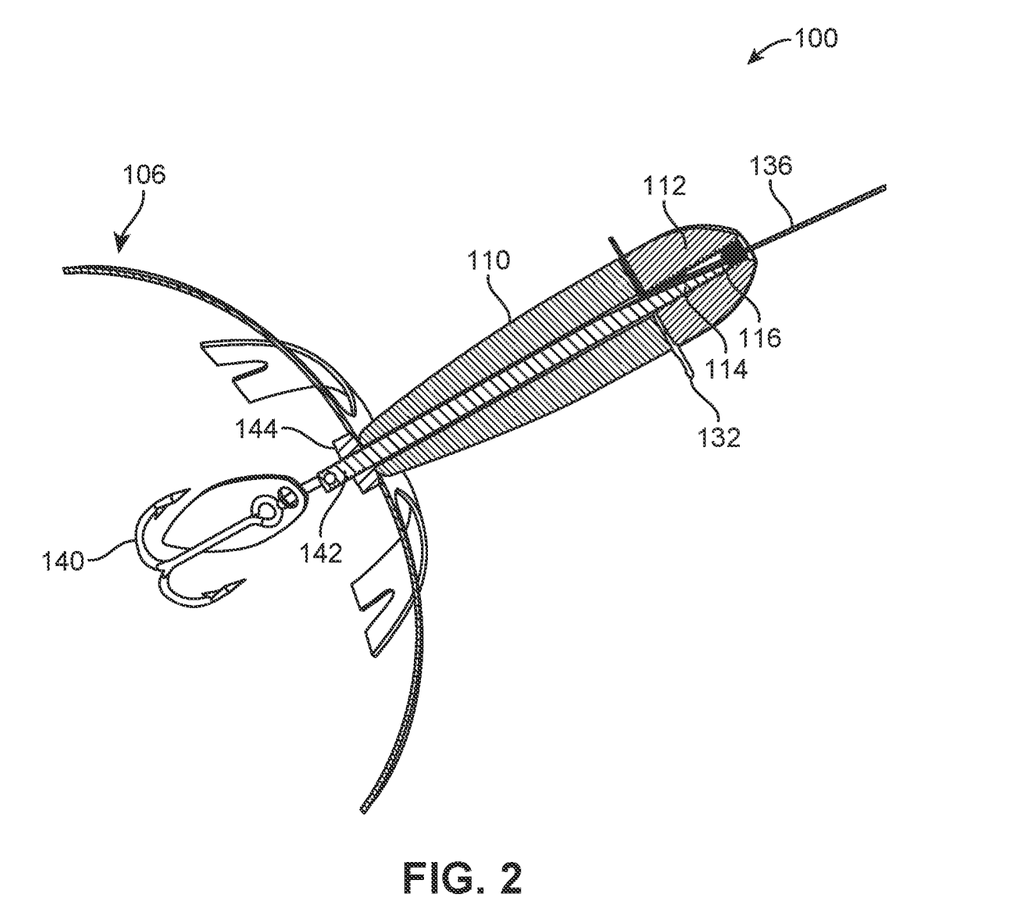
FIG. 2 exemplarily illustrates a cross-sectional view of the fishing lure of FIG. 1.

Referring to FIG. 2, the neck 114 extends from a top flat base or gripping surface of the body 110. The neck 114 is in cylindrical structure having a top side, a bottom side and a sidewall extending between the top and bottom side. The neck 114 further having a slot or port 116. The port 116 formed on the top side of the neck 114 that extends angularly along a proximal length of the axis of the neck 114 and opens at an exterior side of sidewall or bottom side of the neck. In one embodiment, the port 116 opens at an exterior side of the neck 114. In another embodiment, the port 116 extends angularly along a length of the axis of the neck 114. Further, the bottom portion of the body 110 includes an elongated member 142 to which the central mount 126 is slid and secured in position by fastening a nut 144 over the elongated member 142. Further, the lure includes an addition second eyelet 132.

Figure 3:
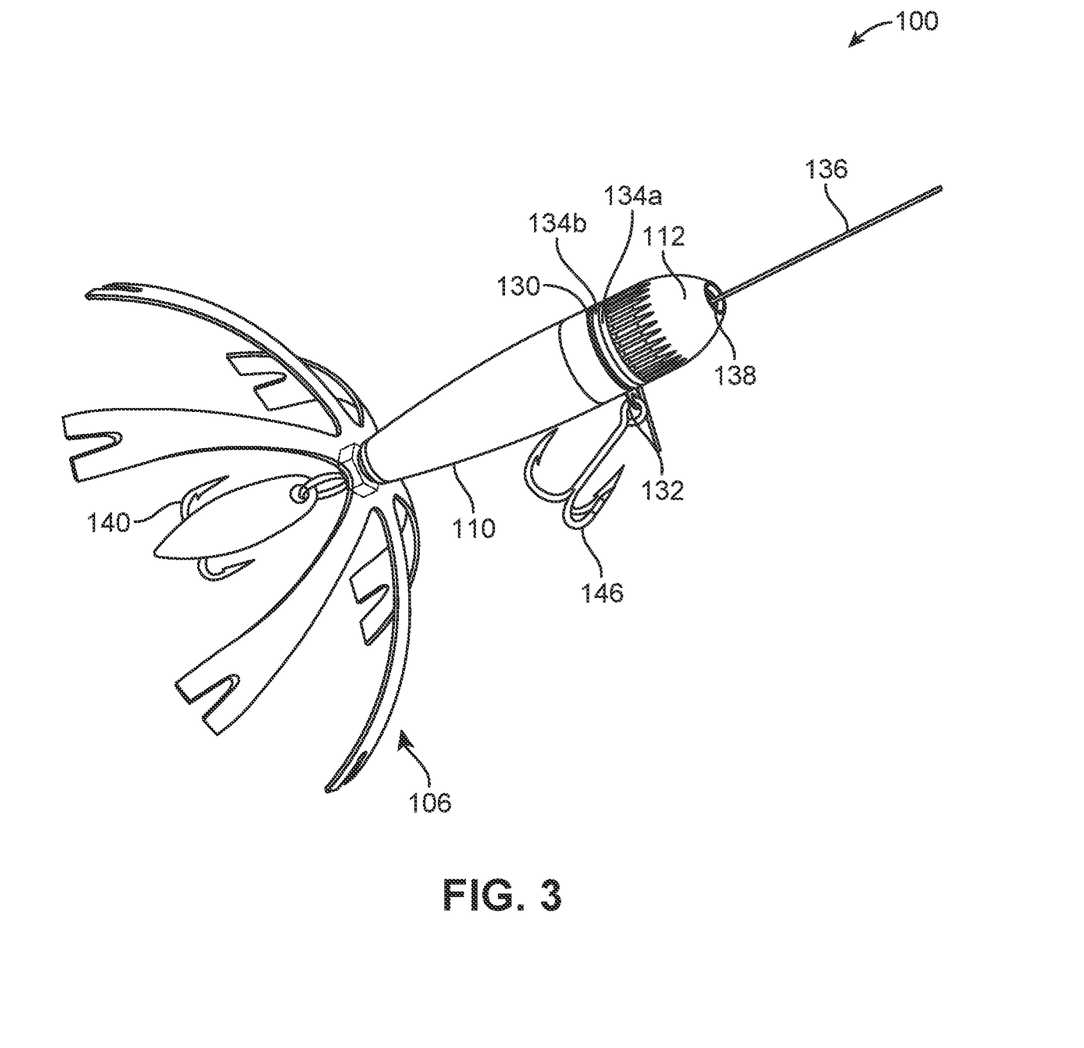
FIG. 3 exemplarily illustrates a perspective view of the fishing lure of FIG. 1 with an additional hook.

Referring to FIG. 3, the lure 100 further comprises an additional ring member 130 disposed at the top portion of the body 110. The second eyelet 132 extends from the additional ring member 130 for securing additional hook 146. The second eyelet 132 is positioned at an angle from the axis of the body 110 and adapted for fastening a fishing line in a jig format to create an alternative swim behavior. The lure 100 may further comprise at least two additional non-metallic members (134a, 134b) between the gripping surface and the head 112. The gripping surface radiating generally outward at an angle from the axis of the neck 114. The at least two non-metallic members (134a, 134b) include a first non-metallic member 134a and a second non-metallic member 134b. In one embodiment, the members (134a, 134b) may be made of material including, but not limited to, rubber and polymer. In another embodiment, the non-metallic members (134a, 134b) are semi-rigid and softer than the fishing line. The lure 100 includes optional weed guard and bite depth control 106. Further, the head 112 includes an aperture 138 for passage of fishing line 136. The fishing line 136 may be of any suitable material, including traditional monofilament, braided line, metal cable, or even semi-rigid wire as may be desired.

Figure 4:
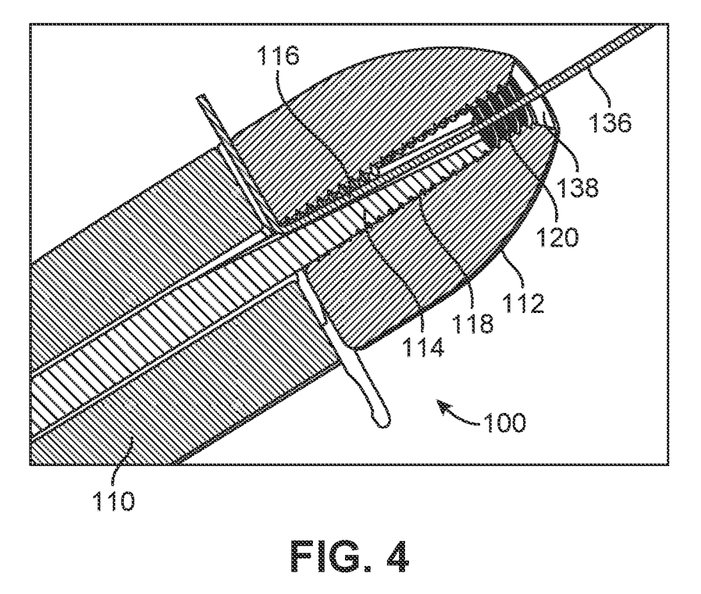
FIG. 4 exemplarily illustrates a cross-sectional view of a fishing line attachment structure of the fishing lure of FIG. 1.

Referring to FIG. 4, the neck 114 includes external circumferential screw threads 118 configured on at least a portion of the longitudinal extent of the neck 114. The external threads 118 may extend along the entire longitudinal extent of the neck 114, or along only a portion of the neck 114. The external threads 118 preferably terminate substantially at the lower or bottom end of the neck 114. The neck 114 further includes the angled port 116. The lure body 110 further comprises the head 112 having internal threads 120 that are adapted to screw and lock with the neck 114. The head 112 further comprises the aperture 138 at a top portion of the head 112. The head 112 allows passage of fishing line 136 from the top portion head 112 to the bottom portion of the head 112. The head 112 defines a first connector and the neck 114 defines a second connector and formed on a top portion of the body 110.

Figure 5:
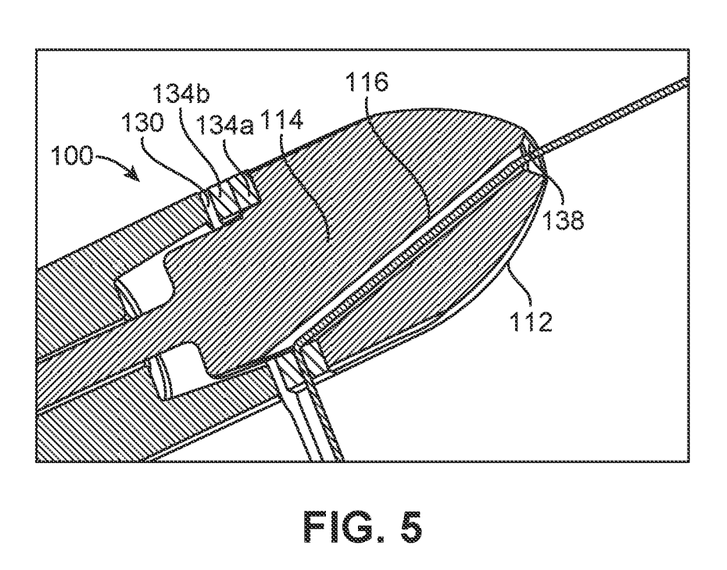
FIG. 5 exemplarily illustrates a cross sectional view of the fishing line attachment structure showing the fishing line secured to the fishing lure of FIG. 1.

Referring to FIG. 4 and FIG. 5, during installation, the fishing line 136 is passed through the aperture 138 of the head 112, and through the port 116 in the neck 114. The fishing line 136 exits from the side of the neck 114. Further, the fishing line 136 is made to pass through the first washer 134a and pulled out from the body structure 104. A portion the fishing line 136 between the non-metallic members (134a, 134b) of the body 110 while the free end of the line 136 hangs freely outside body structure 104. Then the head 112 is screwed to the body 110 which clenches the fishing line 136 between the base of the body 110, neck 114 and the head 112. Optionally, the fishing line 136 may be wrapped around the neck 144 before screwing the head 112 for additional security in securing the line 136. FIG. 5 exemplarily illustrates a cross sectional view of the fishing line attachment structure 108 showing the fishing line 136 secured to the lure 100. Optionally, the head 112 and neck 114 may lock using a snap fit configuration.

The fishing lure 100 with the fishing line attachment structure 108 of FIG. 1 can be configured in number of embodiments (600, 700, 800, 900) as shown in FIG. 6 to FIG. 9. Embodiments (600, 700, 800, 900) have same components and function as of the embodiment 100 with variation in design and hence same term and same numeral is used describing the components of the embodiments (600, 700, 800, 900). The function and method of operation the embodiments (600, 700, 800, 900) can be understood with reference to the fishing lure 100.

Figure 6:
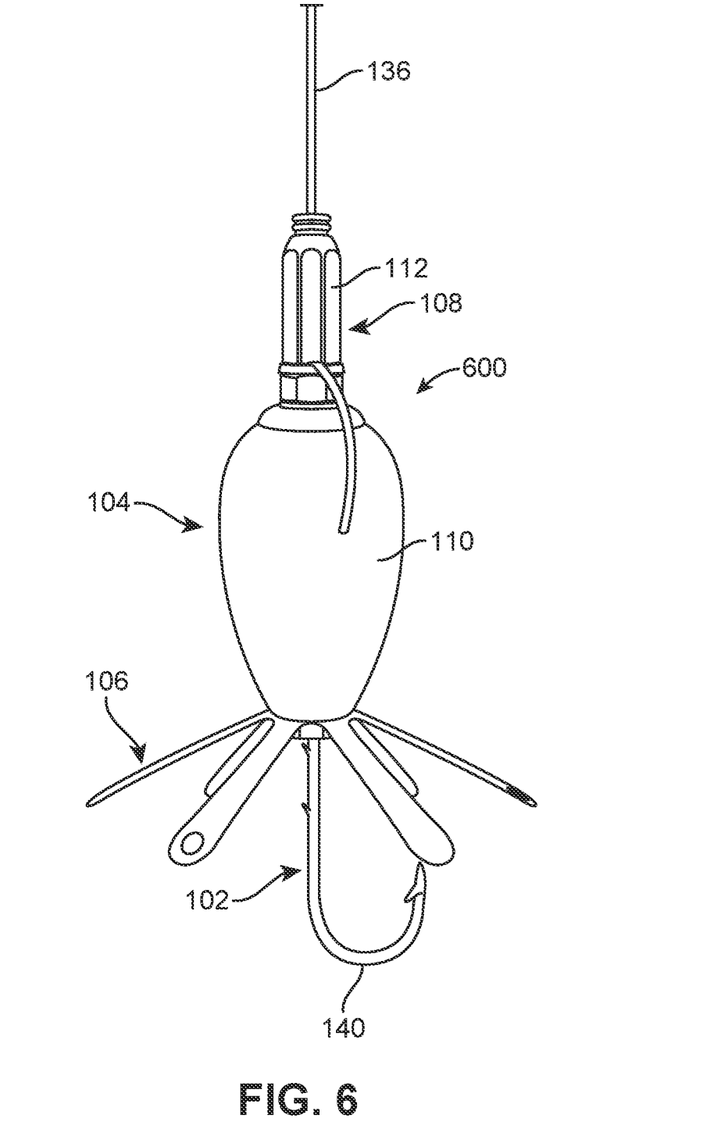
FIG. 6 exemplarily illustrates a fishing lure incorporated with the fishing line attachment structure of FIG. 1, according to yet another embodiment of the present invention.

FIG. 6 exemplarily illustrates a fishing lure 600 incorporated with the fishing line attachment structure 108 of FIG. 1, according to yet another embodiment of the present invention. The lure 600 comprises a fishing hook structure 102 including a hook 140, a body structure 104, a weed guard and bite depth control 106 between the fishing hook structure 102 and body structure 104. The body structure 104 includes a body 110, a neck (not shown) having external threads (not shown) and a head 112 having internal threads (not shown). The neck is configured to receive the fishing line 136 and the head 112 is screwed over the neck thereby fastening the fishing line 136 to the fishing lure 600.

Figure 7:
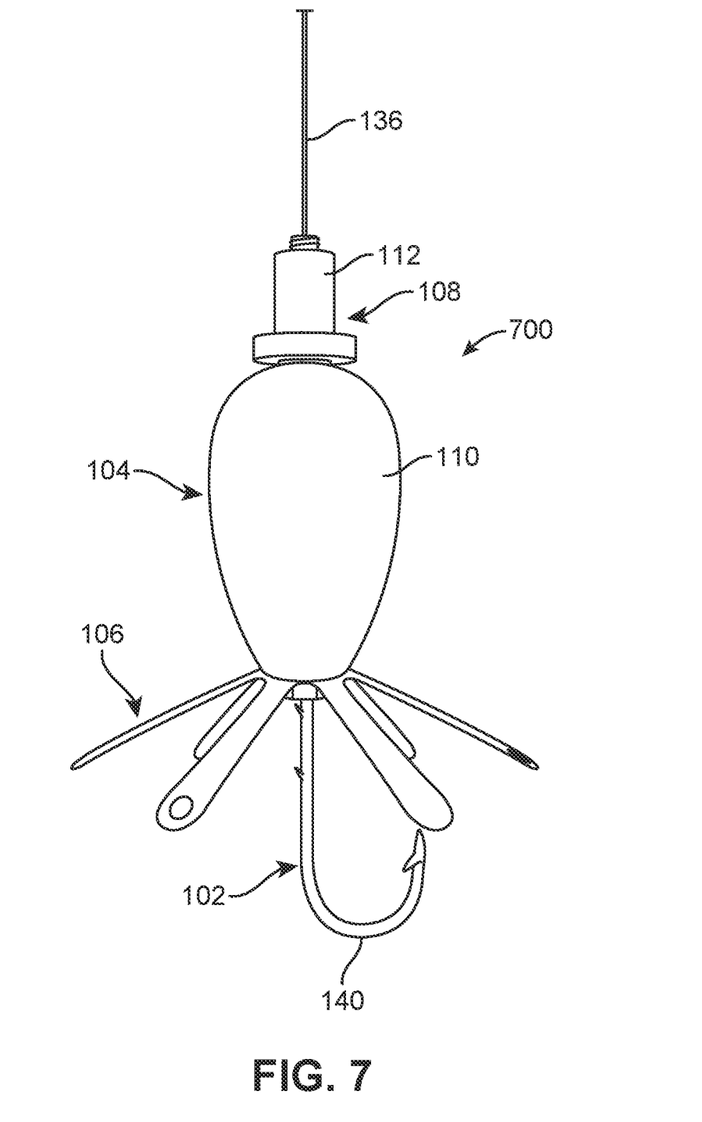
FIG. 7 exemplarily illustrates a fishing lure incorporated with the fishing line attachment structure of FIG. 1, according to yet another embodiment of the present invention.

FIG. 7 exemplarily illustrates a fishing lure 700 incorporated with the fishing line attachment structure 108 of FIG. 1, according to yet another embodiment of the present invention. The lure 700 comprises a fishing hook structure 102 including a hook 140, a body structure 104, a weed guard and bite depth control 106 between the fishing hook structure 102 and body structure 104. The body structure 104 includes a body 110, a neck (not shown) having external threads (not shown) and a head 112 having internal threads (not shown). The neck is configured to receive the fishing line 136 and the head 112 is screwed over the neck thereby fastening the fishing line 136 to the fishing lure 700.

Figure 8:
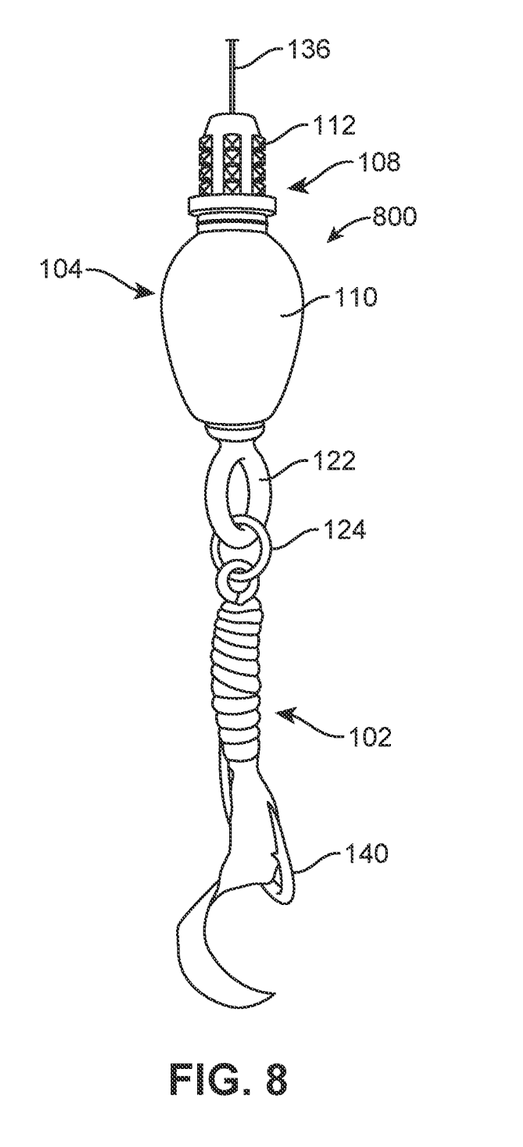
FIG. 8 exemplarily illustrates a fishing lure incorporated with the fishing line attachment structure of FIG. 1, according to yet another embodiment of the present invention.

FIG. 8 exemplarily illustrates a fishing lure 800 (also referred as lure) incorporated with the fishing line attachment structure 108 of FIG. 1, according to yet another embodiment of the present invention. The lure 800 comprises a fishing hook structure 102 including a hook 140, a body structure 104 mounted to the fishing hook structure 102. The body structure 104 includes a body 110, a neck (not shown) having external threads (shown) and a head 112 having internal threads (not shown). The neck is configured to receive the fishing line 136 and the head 112 is screwed over the neck thereby fastening the fishing line 136 to the lure 800. The bottom portion of the body 110 includes a first eyelet 122, and a ring 124 connected to the eyelet 122. The hook 140 is coupled to the ring 124 to hang freely.

Figure 9:
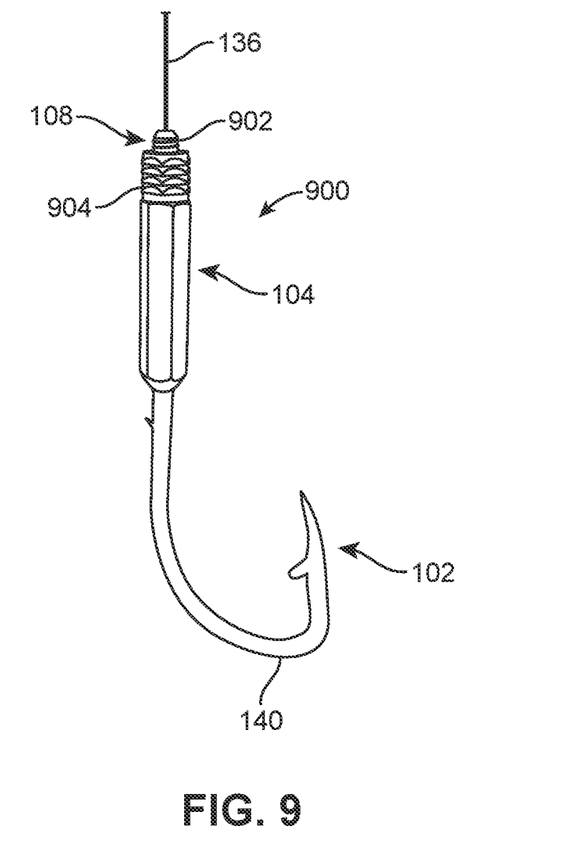
FIG. 9 exemplarily illustrates a fishing lure incorporated with the fishing line attachment structure of FIG. 1, according to yet another embodiment of the present invention.

FIG. 9 exemplarily illustrates a fishing lure 900 incorporated with the fishing line attachment structure 108 of FIG. 1, according to yet another embodiment of the present invention. The lure 900 comprises a body structure 104 and a fishing hook structure 102 mounted to the body structure 104. The fishing hook structure 102 including a hook 140. The body structure 104 includes a cylindrical member 902 having external threads and a lure body member 904 having internal threads (not shown). The lure body member 904 is configured to receive the fishing line 136 and the cylindrical member 902 is screwed over the lure body member 904 thereby fastening the fishing line 136 to the lure 900.

Figure 10:
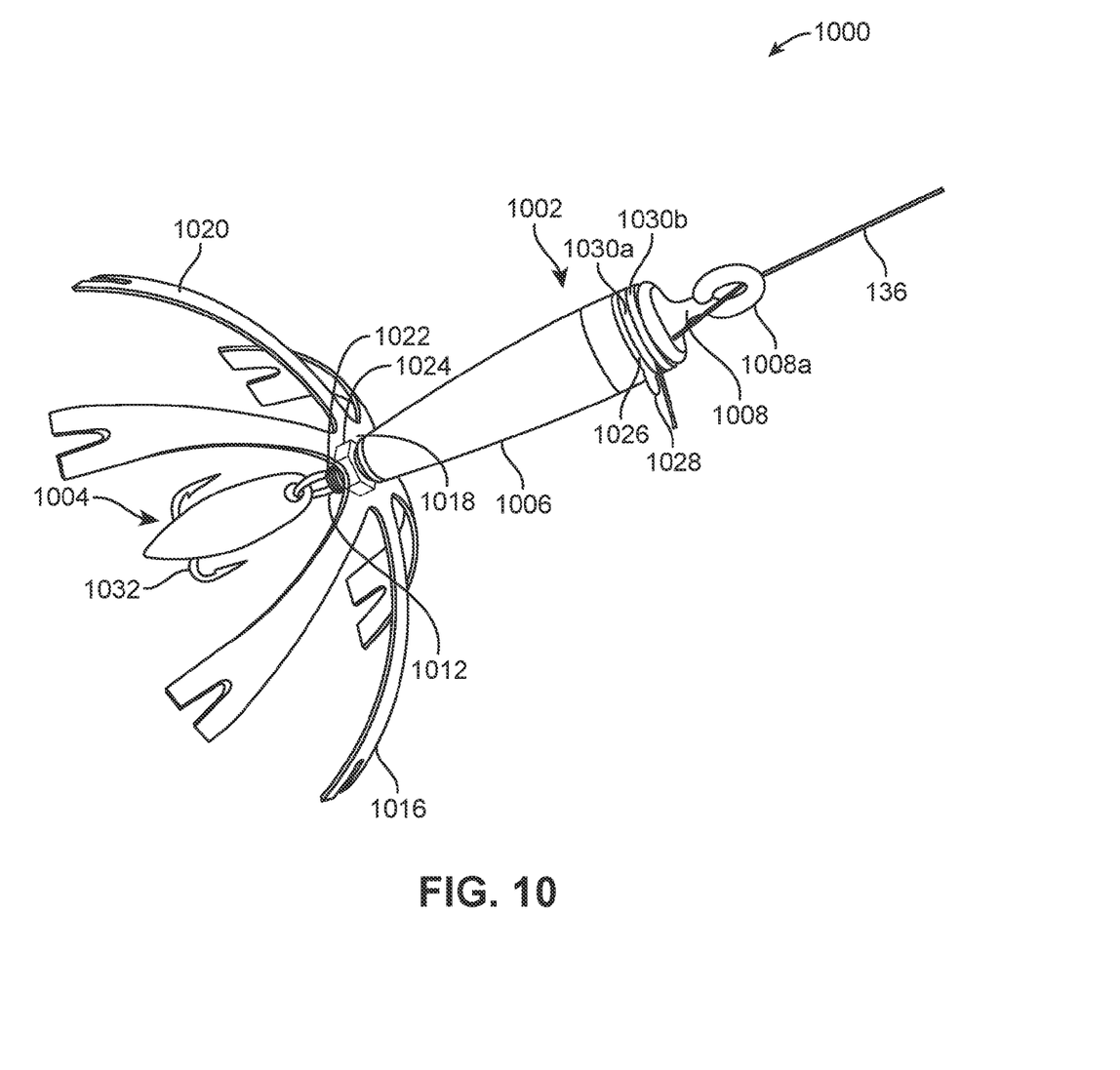
FIG. 10 exemplarily illustrates a perspective view of a fishing lure according to yet another embodiment of the present invention.

FIG. 10 exemplarily illustrates a perspective view of a fishing lure 1000 according to another embodiment of the present invention. The lure 1000 comprises a body structure 1002 having a body 1006, a shaft (not shown) extending from the body 1006 and a head 1008 to lock with the shaft. The shaft defines the first connector and the head 1008 defines the second connector. The first connector and the second connector are formed on a top portion of the body 1006. The shaft and head 1008 define a fishing line attachment structure.

The lure 1000 comprises a first eyelet 1012 fixedly coupled to a bottom portion of the body 1006 for attaching a fishing hook structure 1004. The fishing hook structure 1004 includes a hook 1032. The fishing hook structure 1004 is attached to the first eyelet 1012 such that the fishing hook structure 1004 hangs freely from the first eyelet 1012. In one embodiment, the fishing hook structure 1004 is a treble hook having at least three legs. The lure 1000 further comprises a weed guard and bite depth control 1016 mounted between the fishing hook structure 1004 and the body structure 1002. The weed guard and bite depth control 1016 includes a central mount 1018 and a plurality of legs or fingerlike projections 1020 extend radially or angularly from the axis of the body 1006. The bottom portion of the body 1006 includes an elongated member 1022 to which the central mount 1018 is slid and secured in position by fastening a nut 1024 over the elongated member 1022. The top portion of the body 1006 further comprises a ring member 1026 disposed over the shaft includes a second eyelet 1028, and the second eyelet 1028 is adapted for fastening an additional second hook structure (not shown). The second eyelet 1028 is positioned at an angle from the axis of the body 1006 and adapted for fastening a fishing line in a jig format to create an alternative swim behavior. The body 1006 further comprises at least two non-metallic members (1030a, 1030b) disposed above the ring member 1026. In one embodiment, the non-metallic members (1030a, 1030b) may be made of material including, but not limited to, rubber and polymer.

Further, a proximal eyelet 1008a is disposed at a top portion of the head 1008. During installation, the fishing line 136 is passed through the proximal eyelet 1008a and loop around the shaft of the body 1006 and between the non-metallic members (1030a, 1030b) before tightening and locking the head 1008 to the shaft. Thereby, the fishing line 136 is clenched between the non-metallic members (1030a, 1030b) on locking the head 1008 to the shaft of the body 1006. In one embodiment, the shaft may include external screw threads and the head 1008 may include internal threads. The internal threads of the head 1008 may screw and lock with the external threads over the shaft.

Figure 11:
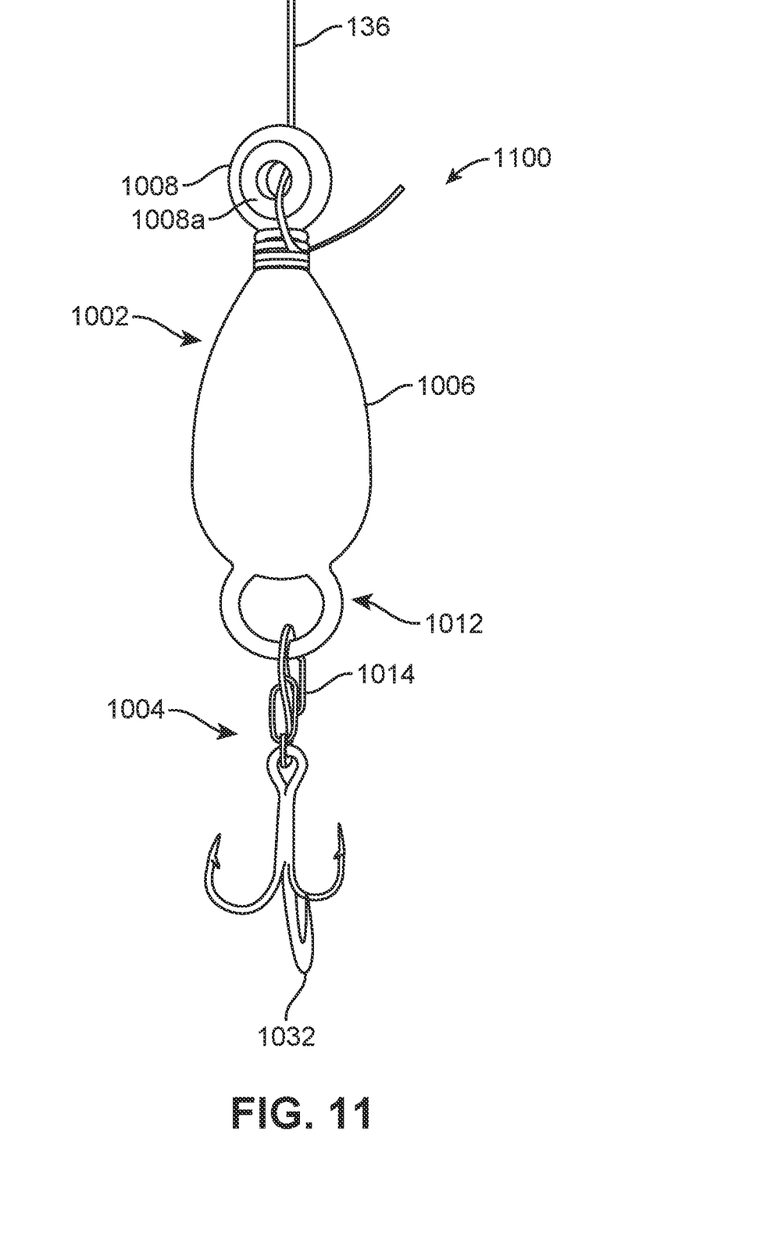
FIG. 11 exemplarily illustrates a fishing lure incorporated with the fishing line attachment structure of FIG. 10, according to yet another embodiment of the present invention.

The fishing lure 1000 with the fishing line attachment structure of FIG. 10 can be configured in number of embodiments. One of the embodiments 1100 is shown in FIG. 11. Embodiment 1100 have same components and function as of the embodiment 1000 with variation in design and hence same term and same numeral is used describing the components of the embodiment 1100. The function and method of operation the embodiment 1100 can be understood with reference to the fishing lure 1000.

FIG. 11 exemplarily illustrates a fishing lure 1100 incorporated with the fishing line attachment structure of FIG. 10, according to yet another embodiment of the present invention. The lure 1100 comprises a body structure 1002 having a body 1006, a shaft extending from the body 1006 and a head 1008 to lock with the shaft. The shaft defines the first connector and the head 1008 defines the second connector. The first connector and the second connector are formed on a top portion of the body 1006.

The lure 1100 comprises a first eyelet 1012 fixedly coupled to a bottom portion of the body 1006 for attaching the fishing hook structure 1004. In one embodiment, a ring 1014 is connected to the first eyelet 1012 such that the ring 1014 hangs freely from the first eyelet 1012. The fishing hook structure 1004 is attached to the ring 1014 such that the fishing hook structure 1004 hangs freely from the ring 1014. The fishing hook structure 1004 includes a hook 1032. In one embodiment, the fishing hook structure 1004 is a treble hook having at least three legs.

Although the features, functions, components, and parts have been described herein in accordance with the teachings of the present disclosure, the scope of coverage of this patent is not limited thereto. On the contrary, this patent covers all embodiments of the teachings of the disclosure that fairly fall within the scope of permissible equivalents.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A fishing lure, consisting of:
   a fishing hook structure;
   a body structure mounted on the fishing hook structure;
   a weed guard and bite depth control mounted between the fishing hook structure and the body structure, wherein the weed guard and bite depth control comprise a central mount attached to the body structure, and a plurality of legs with fingerlike projections extending radially from the axis of the body structure, and
   the body structure having a fishing line attachment structure including a first connector adapted to receive a fishing line, and a second connector configured to lock with the first connector while clenching the fishing line therebetween.

2. The fishing lure of claim 1, wherein the body structure comprises a body, a threaded neck defining the first connector, and wherein the threaded neck has a cylindrical portion extending from the body and a port extending angularly to a proximal axis of the cylindrical portion, to pass the fishing line therethrough.

3. The fishing lure of claim 2, wherein the port opens at an exterior side of the threaded neck.

4. The fishing lure of claim 2, wherein the threaded neck further includes external circumferential screw threads configured on at least a portion of a longitudinal extent of the threaded neck.

5. The fishing lure of claim 4, wherein the body structure further comprises a head defining the second connector, the head having an aperture at a top portion and internal screw threads, and the internal screw threads of the head adapted to screw onto and lock with the external circumferential screw threads of the threaded neck.

6. The fishing lure of claim 5, wherein the fishing line is adapted to pass through the aperture of the head, the port of the neck, and rest on a gripping surface radiating generally outward at an angle from the axis of the neck, from where the neck is integrally mounted to the body structure, and the head is screwed over the neck while clenching the fishing line between the gripping surface of the body structure and the head.

7. The fishing lure of claim 6, wherein the gripping surface comprises at least two non-metallic members, so that the fishing line lies between two non-metallic members that are semi-rigid and softer than the fishing line being clinched.

8. The fishing lure of claim 6, wherein the body structure comprises a ring member disposed over the base of the body structure and around the neck, and wherein the ring member includes a second eyelet positioned at an angle from the axis of the body structure and adapted for fastening an additional second hook structure or fishing line in a jig format to create an alternative swim behavior.

9. The fishing lure of claim 1, wherein the body structure comprises a body, a shaft extending from the body and a head to lock with the shaft, wherein the shaft defines the first connector and the head defines the second connector.

10. The fishing lure of claim 9, wherein the body comprises a ring member disposed over the base of the body and around the neck, and wherein the ring member includes a second eyelet positioned at an angle from the axis of the body and adapted for fastening an additional second hook or fishing line in a jig format to create an alternative swim behavior.

11. The fishing lure of claim 9, further comprising a gripping surface radiating generally outward at an angle from the axis of the body and at least two non-metallic members between the gripping surface and the head, so that the fishing line lies between two members that are semi-rigid yet softer than the fishing line being clenched.

12. The fishing lure of claim 9, wherein the head includes a proximal eyelet to allow threading of the fishing line therethrough, and the fishing line can also be looped around the shaft of the body and between the two non-metallic members before tightening the head over the shaft, and the fishing line is clenched between the non-metallic members by tightening the head to the shaft of the body.

13. A fishing lure consisting of:
a fishing hook structure;
a body structure mounted on the fishing hook structure;
a weed guard and bite depth control mounted between the fishing hook structure and the body structure, wherein the weed guard and bite depth control comprise a central mount attached to the body structure, and a plurality of legs with fingerlike projections extending radially from the axis of the body structure, and
the body structure having a fishing line attachment structure including a first connector adapted to receive a fishing line, and a second connector configured to lock with the first connector,
wherein the body structure having a body, a neck having a cylindrical portion defining the first connector and a head defining the second connector,
wherein the neck having a port extending angularly away from a length of axis of the cylindrical portion,
wherein the neck further includes external circumferential screw threads configured on at least a portion of a longitudinal extent of the neck,
wherein the head having an aperture at a proximal portion to receive the fishing line, and the head further includes internal screw threads adapted to screw and lock with the neck containing external circumferential screw threads, and
wherein the fishing line is adapted to pass through the aperture of the head and the port of the neck, and rest on a gripping surface radiating generally outward at an angle from the axis of the neck, from where the neck is integrally mounted to the body, and the head is screwed over the neck while clenching the fishing line between the gripping surface of the body and the head.

* * * * *